US011692064B2

(12) United States Patent
Mei et al.

(10) Patent No.: US 11,692,064 B2
(45) Date of Patent: Jul. 4, 2023

(54) CONJUGATED AZOPOLYMERS MADE FROM AROMATIC AZIDES AND METHODS FOR MAKING SAME

(71) Applicant: PURDUE RESEARCH FOUNDATION, West Lafayette, IN (US)

(72) Inventors: Jianguo Mei, West Lafayette, IN (US); Christopher Uyeda, Lafayette, IN (US); John Andjaba, Somerville, MA (US); Christopher Rybak, Wheaton, IL (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 17/579,315

(22) Filed: Jan. 19, 2022

(65) Prior Publication Data
US 2022/0227940 A1 Jul. 21, 2022

Related U.S. Application Data

(60) Provisional application No. 63/138,835, filed on Jan. 19, 2021.

(51) Int. Cl.
*C08G 73/06* (2006.01)

(52) U.S. Cl.
CPC ................ *C08G 73/0672* (2013.01)

(58) Field of Classification Search
CPC ........ C08G 73/0672; C08G 2261/3243; C08G 2261/3246; C08G 61/126; C08G 2261/414; C08G 2261/91; C07D 417/14; C07D 487/04; C09B 69/109; C09B 57/00; C09B 57/004; H01L 51/0043; H01L 51/0034; H01L 51/0508; H01L 51/0036; H01L 51/0047; H01L 51/4253; Y02E 10/549

See application file for complete search history.

(56) References Cited

U.S. PATENT DOCUMENTS

2013/0220415 A1* 8/2013 Zhou ................ C08G 61/122
526/257

OTHER PUBLICATIONS

Ploeger, M. et al. "Reductive Cleavage of Azoarene as a Key Step in Nickel-Catalyzed Amidation of Esters with Nitroarenes", EPFL, pp. 1-31, 2020.
Powers, I. et al., Catalytic Azoarene Synthesis from Aryl Azides Enabled by a Dinuclear Ni Complex, J. Am. Chem. Soc 2018, v.140, 4110-4118.

* cited by examiner

*Primary Examiner* — Shane Fang
(74) *Attorney, Agent, or Firm* — Edmonds & Cmaidalka, P.C.

(57) ABSTRACT

A conjugated azopolymer and methods for making same. The azopolymer includes a plurality of monomer units containing isoindigo with $R^1$ and $R^2$ substituent groups, wherein $R^1$ can be one or more C1 to 30 hydrocarbons; and $R^2$ can be H or F. The azopolymer can have a number average molecular weight ($M_n$) of 4 to 20 kDa; a weight average molecular weight ($M_w$) of 12 to 50 kDa; and a poly dispersity index (PDI) of 2 to 3. The polymer can further have selected maximal wavelengths ($\lambda_{max}$) of 481 to 709 nm and electrochemical reduction events of −0.4 to −1.0 V against an Ag/AgCl reference electrode.

3 Claims, No Drawings

CONJUGATED AZOPOLYMERS MADE FROM AROMATIC AZIDES AND METHODS FOR MAKING SAME

CROSS-REFERENCE TO RELATED APPLICATIONS

This application claims priority to U.S. Ser. No. 63/138,835, filed Jan. 19, 2021, which is incorporated by reference herein in its entirety.

GOVERNMENT LICENSE RIGHTS

This invention was made with government support under CHE-1554787 awarded by the National Science Foundation. The government has certain rights in the invention.

BACKGROUND

Field

Embodiments provided herein relate to conjugated polymers and methods for making same. More particularly, embodiments of the present disclosure relate to catalytic synthesis of PolyAzolsoindigo and derivatives thereof.

Description of the Related Art

Conjugated polymers have numerous applications in light capture, energy storage, sensing, and flexible electronic devices. Transition metal catalyzed cross-coupling reactions are the dominant methods for synthesizing high performance conjugated polymers. Despite the success of this approach, cross-coupling reactions can suffer from competing protodemetallation, reductive dehalogenation, and homodimerization processes, which become particularly problematic when using highly functionalized, heteroaromatic, or hindered monomers. These side reactions lead to low average molecular weight polymers and structural defects that negatively impact optical and electronic performance. Additionally, metal byproducts of cross-coupling reactions, particularly organotin halides formed in Stille cross-couplings, must be carefully separated during purification.

There is still a need, therefore, for catalytic polymerization reactions that form conjugated π-systems in high yield, ideally without stoichiometric waste.

SUMMARY

Conjugated polymers containing main chain azoarene repeat units can be synthesized by a dinickel catalyzed N=N coupling reaction of aromatic azides. The polymerization exhibits broad substrates scope and is compatible with heterocycles commonly featured in high performance organic materials, including carbazole, thiophene, propylenedioxythiophene, diketopyrrolopyrrole, and isoindigo. Copolymerizations can be carried out using monomer mixtures, and monoazide chain stoppers can be used to install well-defined end groups. Azopolymers possess unique properties owing to the functionality of the azo linkages and lack of azoxy linkages. For example, protonation at nitrogen results in LUMO lowering and red-shifted absorp-tion bands. Additionally, N=N bonds possess low-lying π*levels, allowing azopolymers to be reversibly reduced under mild conditions.

In at least one embodiment, a conjugated azopolymer is made, comprising a plurality of monomer units including isoindigo with $R^1$ and $R^2$ and n repeats, wherein, $R^1$ is one or more C1 to 30 hydrocarbons; and each $R^2$ is a hydrogen or fluorine atom; and n is an integer from 2 to 192, and wherein the azopolymer has a number average molecular weight ($M_n$) of 4 to 20 kDa; a weight average molecular weight ($M_w$) of 12 to 50 kDa; and a poly dispersity index (PDI) of 2 to 3, and wherein the polymer has selected maximal wavelengths ($\lambda_{max}$) of 481 to 709 nm and electrochemical reduction events of −0.4 to −1.0 V against an Ag/AgCl reference electrode.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various embodiments and across the figures provided herein. This repetition is for the purpose of simplicity and clarity and does not in itself dictate a relationship between the various embodiments and/or configurations. Moreover, the exemplary embodiments presented below can be combined in any combination of ways, i.e., any element from one exemplary embodiment can be used in any other exemplary embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

Furthermore, in the following discussion and in the claims, the terms "including" and "comprising" are used in an open-ended fashion, and thus should be interpreted to mean "including, but not limited to."

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise. For example, embodiments using "an olefin" include embodiments where one, two, or more olefins are used, unless specified to the contrary or the context clearly indicates that only one olefin is used.

Unless otherwise indicated herein, all numerical values are "about" or "approximately" the indicated value, meaning the values take into account experimental error, machine tolerances and other variations that would be expected by a person having ordinary skill in the art. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

Each of the appended claims defines a separate invention, which for infringement purposes is recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions, and examples, but the inventions are not limited to these embodiments, versions or examples, which are included to enable a person having ordinary skill in the art to make and use the inventions, when the information in this disclosure is combined with publicly available information and technology.

As used herein, the term "copolymer" is meant to include polymers having two or more monomers, optionally, with other monomers, and can refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations can include isotactic, syndiotactic and atactic symmetries. The term "blend" as used herein refers to a mixture of two or more polymers.

The term "monomer" or "comonomer," as used herein, refers to the monomer used to form the polymer, i.e., the unreacted chemical compound in the form prior to polymerization, and can also refer to the monomer after it has been incorporated into the polymer, also referred to herein as a "[monomer]-derived unit." Different monomers are discussed herein, including propylene monomers, ethylene monomers, and diene monomers.

As used herein, when a polymer is referred to as comprising a monomer, the monomer is present in the polymer in the polymerized form of the monomer or in the derivative form of the monomer. The term "derived units" as used herein, refers to the polymerized form of the monomer from which the polymer was derived. For example, when a copolymer is said to have a "isoindigo" content of 35 wt % to 55 wt %, it is understood that the monomer unit in the copolymer is derived from isoindigo in the polymerization reaction and said derived units are present at 35 wt % to 55 wt %, based upon the weight of the copolymer.

As used herein, "wt %" means weight percent, "mol %" means mole percent, "vol %" means volume percent, and all molecular weights, e.g., Mw, Mn, Mz, are in units of g/mol, unless otherwise noted. Furthermore, all molecular weights are Mw unless otherwise noted.

As used herein, when a polymer is said to comprise a certain percentage, wt %, of a monomer, that percentage of monomer is based on the total amount of monomer units in the polymer.

As used herein "consisting essentially of" means that the described/claimed composition does not include any other components that will materially alter its properties by any more than 5% of that property, and in any case, does not include any other component to a level greater than 3 wt %.

As used herein, "substantially no," and "substantially free of" are intended to mean that the subject item is not intentionally used or added in any amount but can be present in very small amounts existing as impurities resulting from environmental or process conditions.

A conjugated azopolymer and methods for making same are provided herein. In one or more embodiments, the azopolymer can be made by polymerizing one or more aryl azides monomers. Suitable aryl azide monomers can include any one or more cabazoles, thiophenes, isoindigos, and diketopyrrolopyrroles. The resulting azopolymers benefit from the unique combination of their constituent azoarene monomers and the overall conjugated polymer structure. Azoarenes represent an important class of organic chromophores distinguished for their ability to function as photoswitches. At equilibrium in the dark, azoarenes reside predominantly in their thermodynamically preferred trans geometry; however, upon excitation at their $\pi$-$\pi$* or n-$\pi$* absorption bands, a substantial fraction of the less stable cis form can be generated. This isomerization has been utilized in molecular machines, probes, and therapeutics as a mechanism to trigger conformational changes using incident visible or UV light. As used herein, the term "conjugated polymers" refers to polymers with a primary chain having alternating single and double bonds, which provide numerous applications in light capture, energy storage, sensing, and flexible electronic devices. By utilizing the double bonded nitrogen (N=N) of the azoarene as the conjugated polymer linkage, both light-based properties can be utilized simultaneously.

The azopolymers provided herein can be synthesized using dinickel catalysts that promote the dimerization of aryl azides to form azoarenes. The reaction does not require any additional reagents, and it produces gaseous $N_2$ as the only stoichiometric byproduct. Because N=N bond formation occurs in a redox neutral fashion through nitrene dimerization, the formation of undesired azoxy linkages is avoided. Reaction conditions are mild, allowing for temperature ranges from a low of about 20° C. to a high of about 60° C., using intermittent or continuous stirring for time ranges from a low of about 1.5, 1.75, or 1.9 hours to a high of about 2.1, 2.25, 2.5 hours. The resulting azopolymer is then recovered using an extraction solvent, such as $CHCl_3$, hexane, and $C_6H_5Cl$.

The azopolymers can have a number average molecular weight ($M_n$) range from a low of about 5, 6, or 7 kDa to a high of about 95, 115, or 135 kDa; a weight average molecular weight ($M_w$) range from a low of about 10, 12.5, or 15 kDa to a high of about 300, 330, or 360 kDa; and a poly dispersity index (PDI) range from a low of about 1.9, 2, or 2.1 to a high of about 3, 3.1, or 3.2.

The azopolymer can also have highly desirable spectral properties including a selected maximal wavelengths ($\lambda_{max}$) ranging from a low of about 420, 440, or 460 nm to a high of about 680, 700, or 720 nm, and an electrochemical reduction events of about −0.3, −0.4, or −0.5 to about −0.9, −1.0, or −1.1 V against an Ag/AgCl reference electrode.

In at least one specific embodiment, the azopolymer can be or can include a plurality of monomer units containing isoindigo having $R^1$ and $R^2$ substituent groups, wherein $R^1$ can be one or more C1 to 30 hydrocarbons; and $R^2$ can be H or F. The azopolymer can have a number average molecular weight ($M_n$) of 4 to 20 kDa; a weight average molecular weight ($M_w$) of 12 to 50 kDa; and a poly dispersity index (PDI) of 2 to 3. The polymer can further have selected maximal wavelengths ($\lambda_{max}$) of 481 to 709 nm and electrochemical reduction events of −0.4 to −1.0 V against an Ag/AgCl reference electrode.

The isoindigo units can be represented by the following:

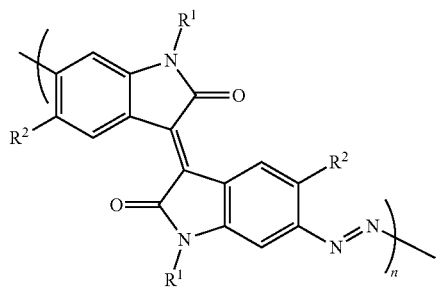

wherein, each R¹ can be one or more C1 to 30 hydrocarbons; and each R² can be hydrogen (H) or fluorine (F); and n can be an integer from 2 to 192.

In certain embodiments, each R¹ can be pentacosan-13-yl or 2-hexyldecyl, or other derivatives thereof.

EXAMPLES

The foregoing discussion can be further described with reference to the following non-limiting examples.

Example 1—PolyAzoCarbazole

Diazido carbazole ("monomer 2") was selected as a model substrate for the initial reaction development studies (Table 1). When $(^{i\text{-}Pr}\text{NDI})\text{Ni}_2(\text{C}_6\text{H}_6)$ (3 mol %) ("catalyst 1") was added to a toluene solution containing monomer 2, effervescence of $N_2$ was observed, and the solution turned deep red over the course of minutes at room temperature. After 2 hours, crude polymer was precipitated from the reaction mixture by addition of 1:1 MeOH/CH$_2$Cl$_2$. PolyAzoCarbazole ("polymer 3") is soluble in toluene-d8 at 100° C. and possesses all of the $^1$H NMR resonances expected for the carbazole repeat unit (aromatic region: 8.47 (s, 2H), 8.16 (d, J=8.4 Hz, 2H), 8.09 (d, J=8.3 Hz, 2H)). ATR-IR analysis of solid samples revealed that nearly all of the azide from the starting material was consumed in the polymerization. However, a small residual stretch at 2106 cm$^{-1}$ was detectable, indicating that unreacted aryl azides are present in the polymer chain ends. By gel permeation chromatography ("GPC"), a number average molecular weight ($M_n$) of 20.4 kDa was calculated (entry 1). This value corresponds to an average of 38 repeat units ($X_n$). The poly dispersity index ("PDI") for polymer 3 is 2.9. Therefore, the polymerization proceeds by a step-growth process based on the catalytic mechanism.

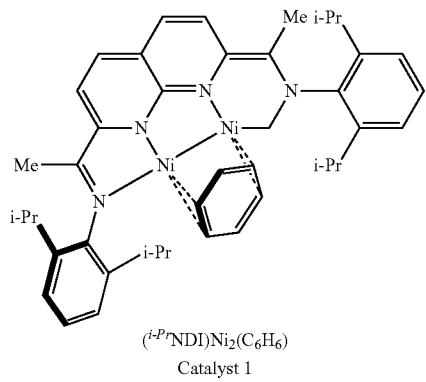

$(^{i\text{-}Pr}\text{NDI})\text{Ni}_2(\text{C}_6\text{H}_6)$
Catalyst 1

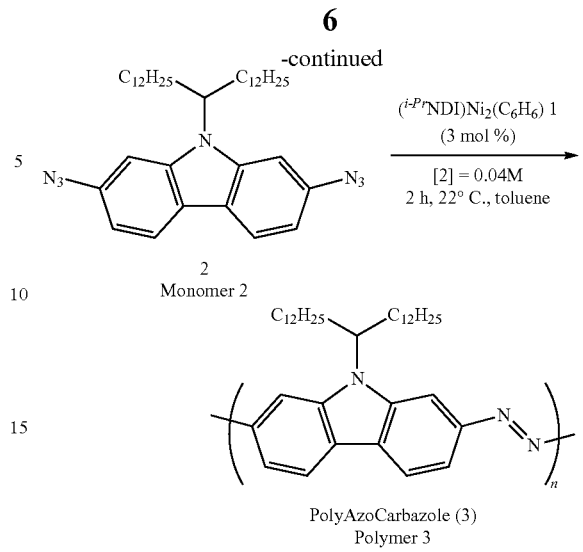

2
Monomer 2

PolyAzoCarbazole (3)
Polymer 3

TABLE 1

| entry | deviation from Standard Conditions | conversion of 2 | $M_n$ (KDa) | $M_w$ (KDa) | PDI | $X_n$ |
|---|---|---|---|---|---|---|
| 1 | none | >99% | 20.5 | 58.7 | 2.9 | 38 |
| 2 | purification by Soxhlet extraction (C$_6$H$_5$Cl) | >99% | 42.2 | 92.5 | 2.2 | 78 |
| 3 | 1 mol % of 1 | 31% | — | — | — | — |
| 4 | 5 mol % of 1 | >99% | 28.2 | 98.5 | 3.5 | 52 |
| 5 | [2] = 0.02M | 79% | — | — | — | — |
| 6 | [2] = 0.08M | >99% | 35.2 | 104.2 | 3.0 | 65 |
| 7 | 60° C. | >99% | 69.0 | 295.9 | 4.3 | 127 |
| 8 | THF instead of toluene | >99% | 8.6 | 18.6 | 2.1 | 16 |

Standard Conditions include: Monomer 2 (0.017 mmol), (i-PrNDI)Ni$_2$(C$_6$H$_6$) (3 mol %), toluene (0.3 mL), 2 h, rt. Polymers were precipitated from the reaction mixtures using 1:1 MeOH/CH$_2$Cl$_2$ and isolated by filtration. Purification includes Polymer 3 was washed with MeOH, hexanes, and CHC$_3$ then extracted with C$_6$H$_5$Cl in a Soxhlet apparatus. Molecular weight and distribution were evaluated by high temperature gel permeation chromatography using 1,2,4-trichlorobenzene at 180° C.

Polymer 3 was further purified in a Soxhlet apparatus by continuous washing with MeOH, hexanes, and CHCl$_3$ then by continuous extraction with C$_6$H$_5$Cl (entry 2). Purification in this manner resulted in a higher average molecular weight polymer ($M_n$=42.0, PDI=2.2), consistent with the removal of low molecular weight fractions. Additionally, the IR band at 2106 cm$^{-1}$ was absent in the Soxhlet purified polymer, due to thermal decomposition of the end group azides.

Higher molecular weight polymers ($M_n$=28.1-69.0) could be obtained by increasing the catalyst loading to 5 mol % (Table 1, entry 4), increasing the reaction concentration two-fold (Table 1, entry 6), or increasing the temperature to 60° C. (Table 1, entry 7). Conversely, lower catalyst loadings (Table 1, entry 3) and lower reaction concentrations (Table 1, entry 5) resulted in incomplete monomer conversion and no high molecular weight products. During optimization studies, aromatic solvents were found to be critical for reaction efficiency. For example, a polymerization conducted in THF produced low molecular weight material (Mn=8.6) (Table 1, entry 8). Previously, it was observed that the primary catalyst resting state for the N=N coupling is the azoarene adduct and that the reaction is zero order in aryl azide. Therefore, the observation of a pronounced solvent effect is consistent with a mechanism involving rate-limiting product displacement by toluene.

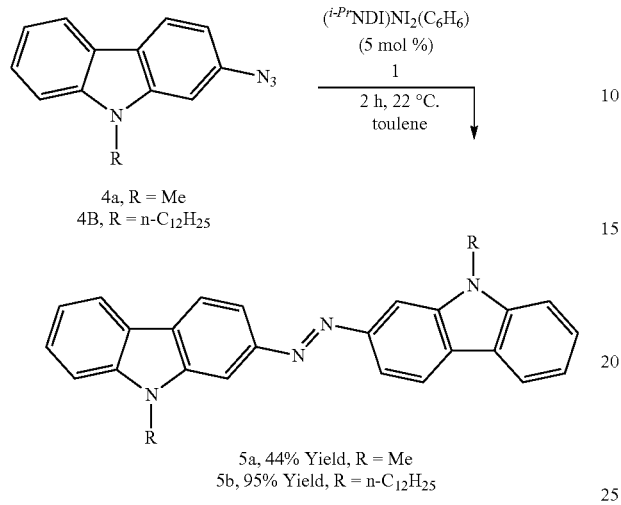

In order to assess the optical properties of polymer 3, the corresponding azocarbazoles 5a and 5b were prepared as reference compounds. Catalytic dimerizations provided 5a and 5b in 44% and 95% yield, respectively (5 mol % of catalyst 1, 2 h, rt). Azocarbazole 5b displays three absorption maxima at 250 nm, 305 nm, and 395 nm. The lowest energy band was assigned as a π-π* transition on the basis of TD-DFT models (B3LYP/6-31G(d,p)-PCM(C$_6$H$_5$Cl) level of theory). The UV-vis features for polymer 3 are significantly red-shifted from those of 5b, consistent with a higher degree of conjugation. Polymer 3 features intense absorption maxima at 503 nm and 538 nm, with shoulders extending to 350 nm.

Azocarbazole 5b photoisomerizes to its Z form when irradiated with a 395 nm violet LED. During irradiation, the intense band at 395 nm bleaches, and new features grow in at shorter wavelengths ($\lambda_{max}$=300 and 320 nm). When stored in the dark at room temperature, 5b under-goes isosbestic conversion back to its E form with a half-life of 4 min. In comparison to the well-defined photoswitching behavior of azocarbazole 5b, polymer 3 exhibits minimal changes in its absorption spectrum when irradiated at the 538 nm band (555 nm green LED). Azobenzene photoisomerization requires a significant reduction in the N=N bond order upon population of the π* excited state. Thus, the lack of photoswitching in polymer 3 is indicative of a highly delocalized excited state electronic structure, where the N=N π* character is distributed over several azo units.

Example 2—PolyAzolsoindigo

In order to synthesize the monomer for polymerization, first (E)-6,6'-dibromo-1,1'-di(pentacosan-13-yl)-[3,3'-biindolinylidene]-2,2'-dione was synthesized. 6,6'-dibromoisoindigo (0.42 g, 1.0 mmol, 1.0 equiv) and Cs$_2$CO$_3$ (0.98 g, 3.0 mmol, 3.0 equiv) were added to a reaction flask and sealed. The reaction vessel was sparged 3 times to remove air, thereafter anhydrous N,N-Dimethylformamide (10 mL) was added and the mixture was heated at 70° C. After 30 minutes of heating pentacosan-13-yl 4-methylbenzenesulfonate (1.2 g, 2.2 mmol, 2.2 equiv) dissolved in anhydrous N,N-Dimethylformamide (10 mL) was added and the reaction was allowed to stir for 16 h at 70° C. After cooling to room temperature, the reaction mixture was filtered and the filtrate was concentrated under reduced pressure. The residue was purified by column chromatography (SiO2, hexanes, Rf=0.2). The product was isolated as a deep red solid (0.56 g, 50% yield).

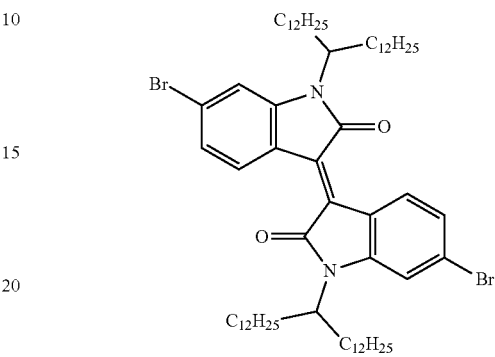

(E)-6,6'-dibromo-1,1'-di(pentacosan-13-yl)-[3,3'-biindolinylidene]-2,2'-dione

Then (E)-1,1'-di(pentacosan-13-yl)-6,6'-bis(4,4,5,5-tetramethyl-1,3,2-dioxaborolan-2-yl)[3,3'-biindolinylidene]-2,2'-dione was synthesized. In an N$_2$ filled glovebox, a Schlenk tube was charged with (E)-6,6'-dibromo-1,1'-di(pentacosan-13-yl)-[3,3'-biindolinylidene]-2,2'-dione (0.56 g, 0.50 mmol, 1.0 equiv), Pd(dppf)Cl$_2$ (0.022 g, 0.030 mmol, 0.060 equiv), bis(pinacolato)diboron (0.38 g, 1.5 mmol, 3.0 equiv), KOAc (0.29 g, 3.0 mmol, 6.0 equiv) and 1,4-dioxane (10.0 mL). The reaction vessel was sealed, removed from the glovebox and heated at 80° C. for 16 h. After cooling to room temperature, the reaction mixture was filtered and the filtrate was concentrated under reduced pressure. The residue was purified by column chromatography (SiO2, 20% CH$_2$Cl$_2$/hexanes, R$_f$=0.25). The product was isolated as a deep red solid (0.49 g, 80% yield).

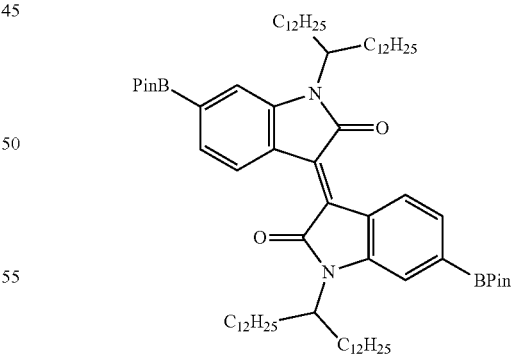

(E)-1,1'-di(pentacosan-13-yl)-6,6'-bis(4,4,5,5-tetramethyl-1,3,2-dioxaborolan-2-yl)-[3,3'-biindolinylidene]-2,2'-dione Then (E)-6,6'-diazido-1,1'-di(pentacosan-13-yl)-[3,3'-biindolinylidene]-2,2'-dione was synthesized. NaN$_3$ (0.036 g, 0.56 mmol, 3.0 equiv) and Cu(OAc)$_2$ (7.0 mg, 0.037 mmol, 0.20 equiv), were added to a solution of (E)-1,1'-di(pentacosan-13-yl)-6,6'-bis(4,4,5,5-tetramethyl-1,3,2-dioxaborolan-2-yl)-[3,3'-biindolinylidene]-2,2'-dione (0.23 g, 0.19 mmol, 1.0 equiv) in a mixture of $CHCl_3$ (3.5 mL) and MeOH (3.5 mL). The reaction was heated at 55° C. and stirred under air for 16 h. After cooling to room temperature, the reaction mixture was filtered and the filtrate was concentrated under reduced pressure. The residue was purified by column chromatography (SiO2, 10% $CH_2Cl_2$/hexanes, $R_f$=0.3). The product was isolated as a deep red solid (0.098 g, 50% yield).

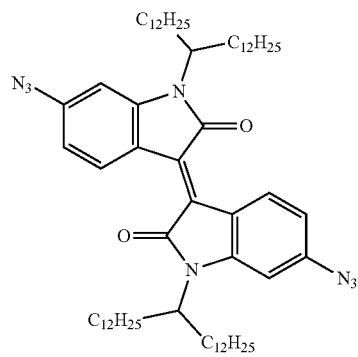

(E)-6,6'-diazido-1,1'-di(pentacosan-13-yl)-[3,3'-biindolinylidene]-2,2'-dione

Then PolyAzolsoindigo 1 was synthesized according to the standard conditions using (E)-6,6'-diazido-1,1'-di(pentacosan-13-yl)[3,3'-biindolinylidene]-2,2'-dione (0.098 g, 0.094 mmol, 1.0 equiv), toluene (2.3 mL), and 1 (6.8 mg, 9.4 mol, 10 mol %). Soxhlet wash solvents: MeOH then hexanes. The extraction solvent used was $CHCl_3$. PolyAzolsoindigo was isolated as a green solid (0.091 g, 93% yield).

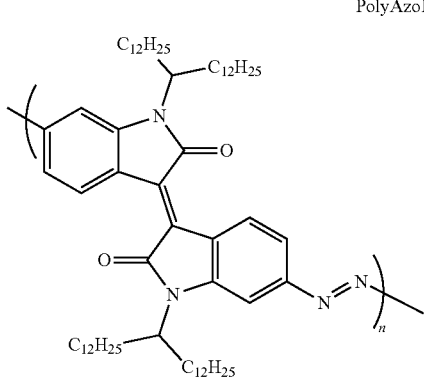

PolyAzoIsoindigo 1

In another embodiment, the PolyAzoIsoindigo synthesis resulted in the following structure:

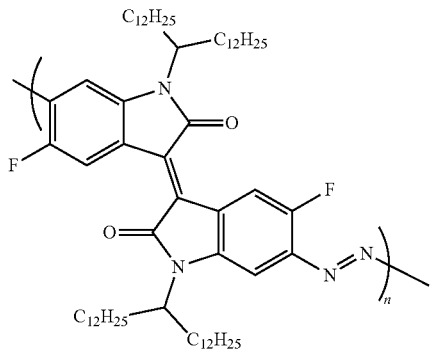

PolyAzoIsoindigo 2

In another embodiment, the PolyAzoIsoindigo synthesis resulted in the following structure:

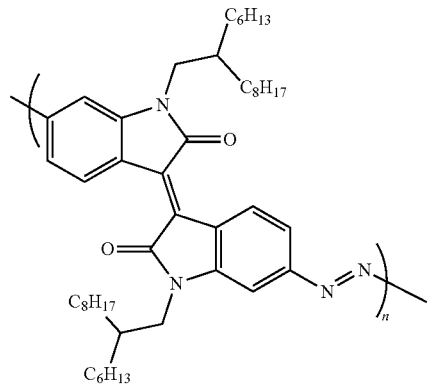

PolyAzoIsoindigo 3

Substrate Scope Studies

With optimized reaction conditions in hand, it was next examined the substrate scope of the azopolymerization (Table 2). PolyAzoFluorene (polymer 6) was generated with $M_n$=101.9 kDa ($X_n$=192), which is an unexpectedly high average molecular weight relative to conjugated main chain azopolymers that have been synthesized by other N=N coupling methods. Polymerizations of thiophene-containing monomers proceeded efficiently to form yellow polymer 8 and orange polymer 9. Finally, azopolymers of different absorption wavelengths could be obtained by incorporating various chromophores into the repeat units. For example, PolyAzoIsoindigo ("polymer 10") and PolyAzoTDPP ("polymer 7") are both green polymers obtained with $M_n$=18.2 kDa and 6.4 kDa, respectively. The relatively low molecular weight of polymer 7 is likely due to the limits of solubility rather than inefficient N=N coupling. When polymerizations yielding 7 were run at higher catalyst loadings, copious amounts of precipitate were obtained that could not be redissolved in $CHCl_3$ or $C_6H_5Cl$.

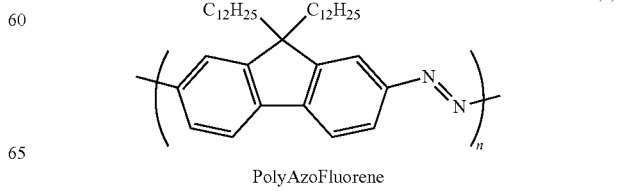

(6)

PolyAzoFluorene

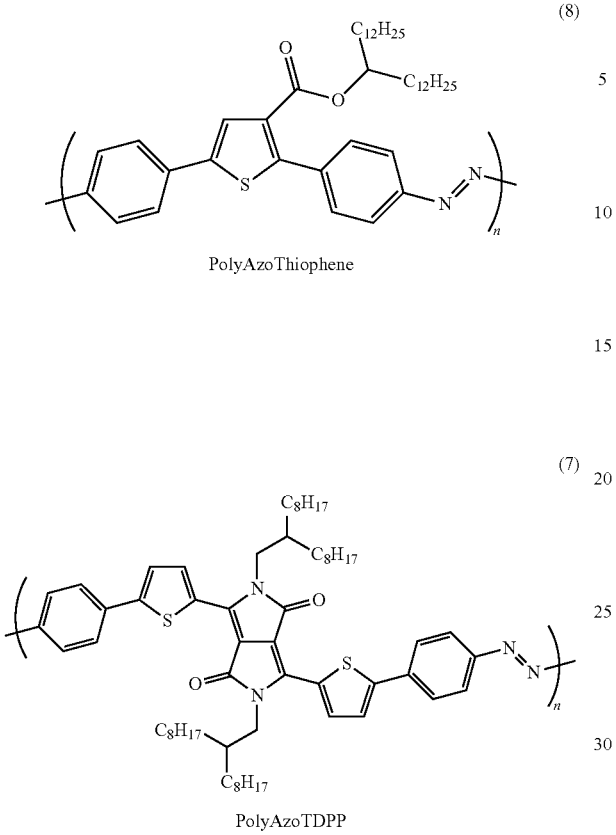

PolyAzoThiophene (8)

PolyAzoTDPP (7)

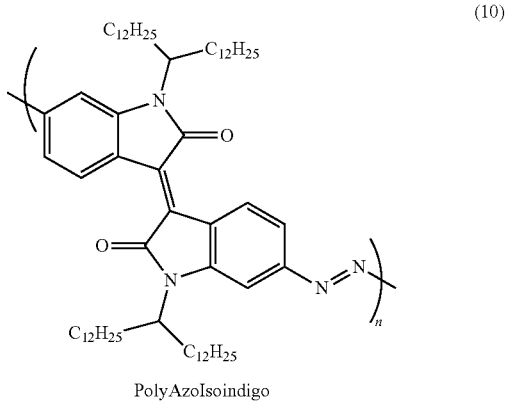

PolyAzoIsoindigo (10)

TABLE 2

| entry | polymer | $M_n$ (kDa) | $M_w$ (kDa) | PDI | $X_n$ | selected $\lambda_{max}$ values |
|---|---|---|---|---|---|---|
| 1 | PolyAzoFluorene (6) | 101.9 | 336.9 | 2.1 | 193 | 484 (17,000), 520 (18,000) |
| 2 | PolyAzoTDPP (7) | 6.4 | 12.5 | 2.0 | 6.5 | 426 (3,500), 664 (8,600) |
| 3 | PolyAzoThiophene (8) | 39.4 | 122.9 | 3.1 | 60 | 427 (15,000) |
| 4 | PolyAzoProDOT (9) | 60.4 | 143.3 | 2.4 | 55 | 514 (20,000), 543 (sh) |
| 5 | PolyAzoIsoindigo (10) | 18.2 | 48.1 | 2.6 | 18 | 481 (17,000), 664 (25,000), 709 (26,000) |
| 6 | PolyAzoProDOT/TDPP (1:1 9/7) (11) | 50.4 | 118.6 | 2.4 | — | 442 (sh), 534 (7,900), 659 (sh), 710 (13,000) |
| 7 | PolyAzoProDOT/TDPP (3:1 9/7) (12) | 97.9 | 246.4 | 2.5 | — | 521 (11,00), 644 (sh), 692 (6,300) |

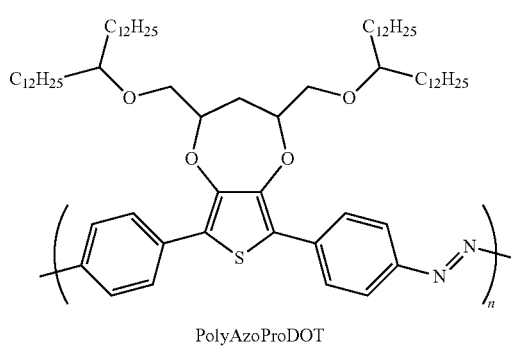

PolyAzoProDOT (9)

Co-Polymerization of a Monomer Mixture

Copolymerization experiments were carried out using a mixture of thiophene-flanked diketopyrrolopyrrole ("TDPP") and propylenedioxythiophene ("ProDOT") monomers. PolyAzoProDOT ("polymer 9") is an orange polymer with an absorption maximum at 514 nm ($\varepsilon$=20,000 $M^{-1}$ $cm^{-1}$), and polymer 7 is a green polymer with absorption maxima at 664 nm ($\varepsilon$=8,500 $M^{-1}$ $cm^{-1}$) and 426 nm ($\varepsilon$=3,500 $M^{-1}$ $cm^{-1}$) (Figure 3). The copolymer 11 obtained using a 1:1 mixture of TDPP and ProDOT monomers is purple and absorbs across most of the visible spectrum (400-800 nm). Whereas the TDPP polymer 7 has limited solubility and could only be obtained in low molecular weight, the copolymer 11 had a higher average molecular weight ($M_n$=50.4 kDa), approaching that of the more soluble ProDOT polymer 9. The features in the UV—vis spectrum of copolymer 11 match the primary absorption bands of the two homopolymers 7 and 9:442 (sh), 534, 659 (sh), and 710 nm. When the ratio of monomers is adjusted to 3:1 (ProDOT/TDPP), the relative intensities of these features change in a manner that is consistent with a higher fraction of the ProDOT repeat unit.

Incorporation of End-Groups into Azopolymers

Monofunctional chain stoppers can be used in step-growth polymerizations to control average molecular weight and to incorporate well-defined end groups. Carbazole diazide was polymerized in the presence of carbazole monoazide under the standard catalytic conditions found in Table 1. Consistent with the monofunctional azide promoting chain termination, the average molecular weight of polymer 13 ($M_n$=14.1 kDa) was lower than that of polymer 3, obtained in the absence of the chain stopper ($M_n$=20.4 kDa). In the high-temperature $^1$H NMR spectrum of polymer 13, there is a distinct resonance that can be assigned to the end groups at 3.54 ppm (C—H groups of the alkyl side chain immediately adjacent to the carbazole ring). By integrating this signal against that of the internal repeat units (4.70 ppm), an average ratio of 26.6 repeat units for every two end groups was calculated, which is similar to the $X_n$=26 obtained from GPC analysis.

Other end groups could also be readily incorporated into azopolymers. Polymers containing 2-CF3Ph, ferrocene, and isoindigo end groups were obtained with average molecular weights ranging from 17.6-16.4 kDa. In all cases, the end groups could be clearly detected in the high temperature $^1$H NMR spectra of the isolated polymers. In the case of polymer 13, there is a $^{19}$F NMR signal at −58.82 ppm, assigned to the 2-CF$_3$ group. Finally, a thin film of the ferrocene-capped polymer dropcasted onto a glassy carbon electrode displayed a low-intensity reversible redox event at +0.02 V vs. free Fc/Fc$^+$.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

The foregoing has also outlined features of several embodiments so that those skilled in the art can better understand the present disclosure. Those skilled in the art should appreciate that they can readily use the present disclosure as a basis for designing or modifying other methods or devices for carrying out the same purposes and/or achieving the same advantages of the embodiments disclosed herein. Those skilled in the art should also realize that such equivalent constructions do not depart from the spirit and scope of the present disclosure, and that they can make various changes, substitutions, and alterations herein without departing from the spirit and scope of the present disclosure, and the scope thereof is determined by the claims that follow.

We claim:

1. A conjugated azopolymer, comprising a plurality of monomer units represented as follows:

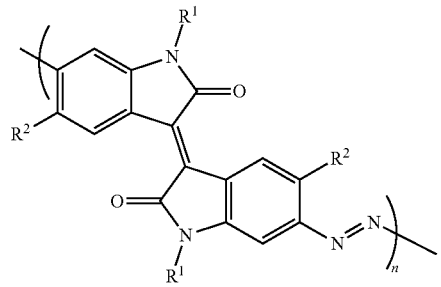

wherein,
$R^1$ is one or more C1 to C30 hydrocarbons; and
each $R^2$ is a hydrogen or fluorine atom; and
n is an integer from 2 to 192, and wherein the azopolymer has a number average molecular weight ($M_n$) of 4 to 20 kDa; a weight average molecular weight ($M_w$) of 12 to 50 kDa; and a poly dispersity index (PDI) of 2 to 3, and wherein
the polymer has selected maximal wavelengths ($\lambda_{max}$) of 481 to 709 nm and electrochemical reduction events of −0.4 to −1.0 V against an Ag/AgCl reference electrode.

2. The polymer of claim 1, wherein $R^1$ is pentacosan-13-yl.

3. The polymer of claim 1, wherein $R^1$ is 2-hexyldecyl.

* * * * *